(12) United States Patent
Kiyokawa et al.

(10) Patent No.: US 12,240,696 B2
(45) Date of Patent: Mar. 4, 2025

(54) AUTOMATED WAREHOUSE SYSTEM, METHOD FOR CORRECTING MISALIGNMENT OF PLACEMENT POSITION OF ARTICLE IN AUTOMATED WAREHOUSE SYSTEM, COMPUTER PROGRAM, AND RECORDING MEDIUM

(71) Applicant: Daifuku Co., Ltd., Osaka (JP)

(72) Inventors: Wataru Kiyokawa, Tokyo (JP); Kenji Hasegawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 584 days.

(21) Appl. No.: 17/707,450

(22) Filed: Mar. 29, 2022

(65) Prior Publication Data
US 2022/0315335 A1 Oct. 6, 2022

(30) Foreign Application Priority Data
Mar. 30, 2021 (JP) .................... 2021-056573

(51) Int. Cl.
*B65G 1/04* (2006.01)
*B65G 1/06* (2006.01)
*G05B 19/418* (2006.01)

(52) U.S. Cl.
CPC ......... *B65G 1/0492* (2013.01); *B65G 1/0421* (2013.01); *B65G 1/065* (2013.01); *G05B 19/41895* (2013.01); *B65G 2203/0208* (2013.01); *B65G 2203/0233* (2013.01); *G05B 2219/50393* (2013.01)

(58) Field of Classification Search
CPC .... B65G 1/0492; B65G 1/065; B65G 1/0421; B65G 2203/0208; B65G 2207/40; B65G 1/04; B65G 1/0414; B65G 2203/0233; B65G 2203/0283; G05B 19/41895; G05B 2219/50393
See application file for complete search history.

(56) References Cited

U.S. PATENT DOCUMENTS

2006/0254997 A1* 11/2006 Pellegrino ............ A47B 47/021
211/195
2018/0370729 A1* 12/2018 Ueda .................... B65G 1/065
2022/0067642 A1* 3/2022 Barton ............. G06Q 30/0617

FOREIGN PATENT DOCUMENTS

| EP | 3418222 A1 | 12/2018 |
|---|---|---|
| JP | 201157334 A | 3/2011 |
| JP | 2019189409 A | 10/2019 |
| JP | 2020158216 A | 10/2020 |

* cited by examiner

*Primary Examiner* — Thomas Randazzo
(74) *Attorney, Agent, or Firm* — The Webb Law Firm

(57) ABSTRACT

A control unit provided in an automated warehouse system includes a misalignment determination unit that, after storage of an article in a storage rack, determines whether or not an article is estimated to have been subjected to vibration exceeding a predetermined threshold value, and a misalignment correction instruction unit that, if the misalignment determination unit determined that the article is estimated to have been subjected to vibration exceeding the predetermined threshold value, outputs a control signal to a transport device to drive the transport device to execute a misalignment correction operation with respect to the placement position of the article.

17 Claims, 12 Drawing Sheets

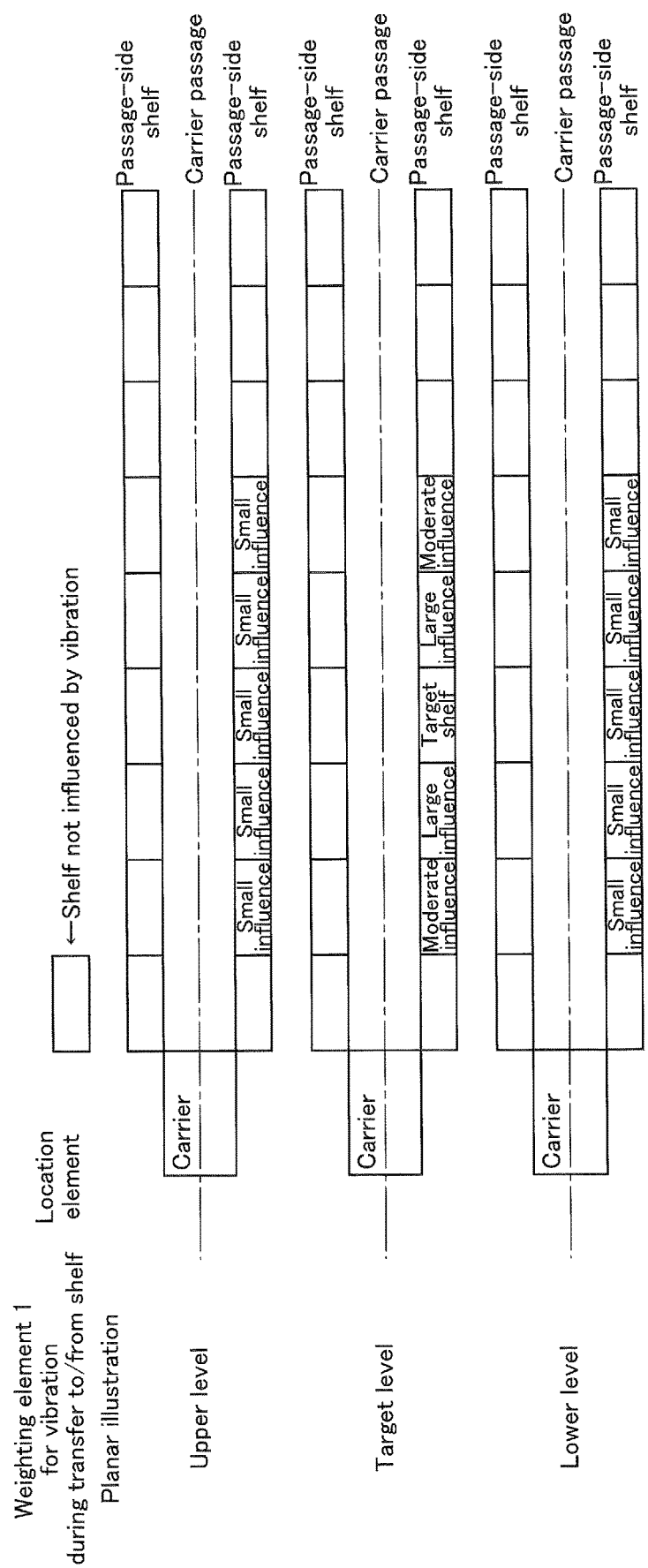

Fig.6

| Storage case shift element | Transfer level | Weighting element 1 Location coefficient | Weighting element 2 Weight coefficient | | Count | Score |
|---|---|---|---|---|---|---|
| Shift due to transfer vibration | Small vibration influence | 0.2 | Light | 0.5 | 100 | 10 |
| | | 0.2 | Medium | 1 | 235 | 47 |
| | | 0.2 | Heavy | 2 | 75 | 30 |
| | Moderate vibration influence | 2 | Light | 0.5 | 25 | 25 |
| | | 2 | Medium | 1 | 35 | 70 |
| | | 2 | Heavy | 2 | 10 | 40 |
| | Large vibration influence | 6 | Light | 0.5 | 10 | 30 |
| | | 6 | Medium | 1 | 15 | 90 |
| | | 6 | Heavy | 2 | 5 | 60 |

| Storage case shift element | Carrier passage level | Weighting element 1 Location coefficient | Weighting element 2 Weight coefficient | | Passage count | Score |
|---|---|---|---|---|---|---|
| Shift due to carrier passage vibration | Upper level passage count | 0.002 | Light | 0.5 | 350 | 0.35 |
| | | 0.002 | Medium | 1 | 400 | 0.8 |
| | | 0.002 | Heavy | 2 | 200 | 0.8 |
| | Target level passage count | 0.005 | Light | 0.5 | 200 | 0.5 |
| | | 0.005 | Medium | 1 | 250 | 1.25 |
| | | 0.005 | Heavy | 2 | 100 | 1 |
| | Lower level passage count | 0.005 | Light | 0.5 | 300 | 0.75 |
| | | 0.005 | Medium | 1 | 275 | 1.375 |
| | | 0.005 | Heavy | 2 | 225 | 2.25 |

| Total Score | | | 411 |
|---|---|---|---|

Determination logic
< 500 OK

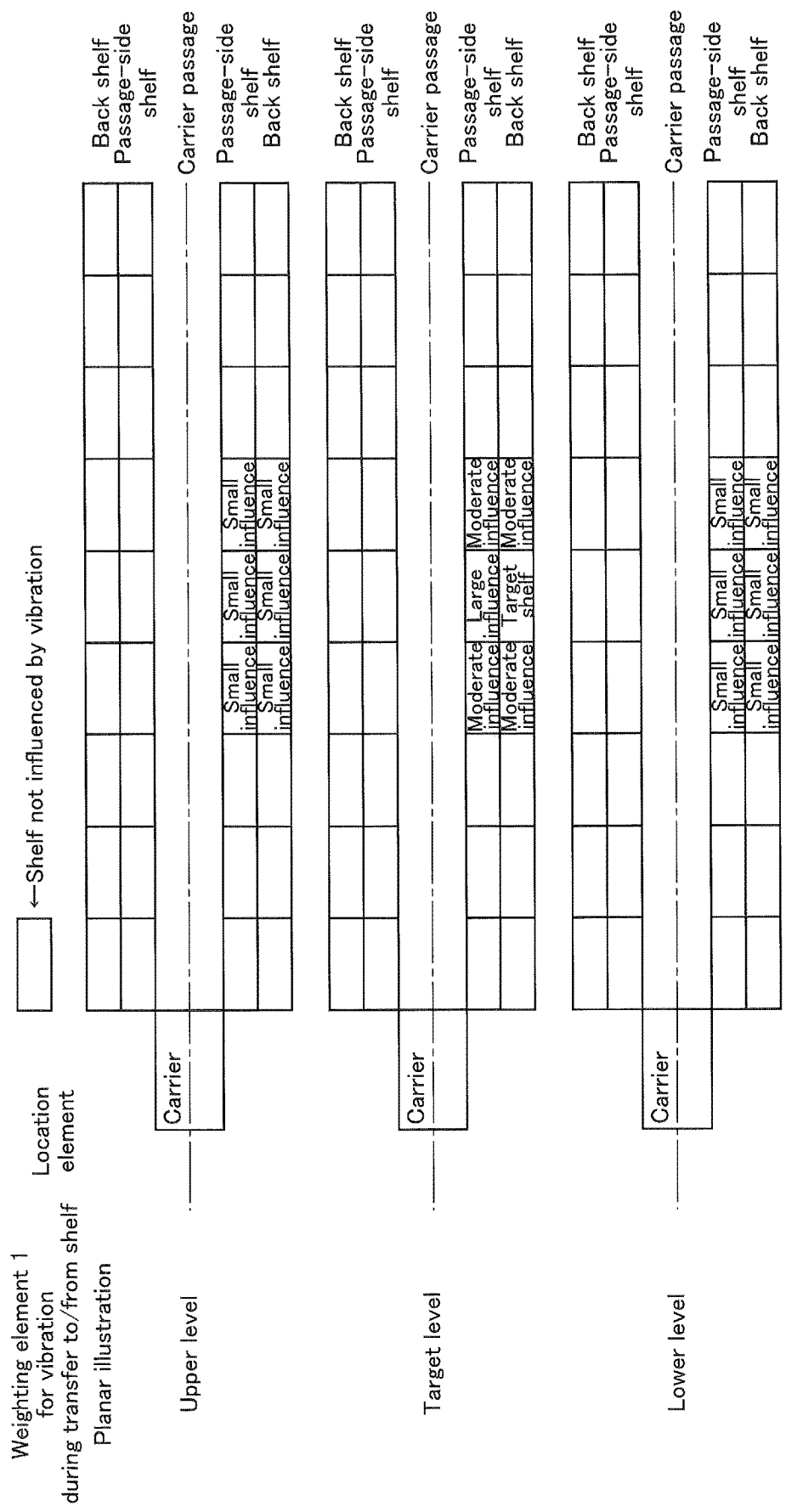

Fig.8

| Storage case shift element | Transfer level | Weighting element 1 Location coefficient | Weighting element 2 Weight coefficient | | Count | Score |
|---|---|---|---|---|---|---|
| Shift due to transfer vibration | Small vibration influence | 0.2 | Light | 0.5 | 100 | 10 |
| | | 0.2 | Medium | 1 | 235 | 47 |
| | | 0.2 | Heavy | 2 | 75 | 30 |
| | Moderate vibration influence | 2 | Light | 0.5 | 25 | 25 |
| | | 2 | Medium | 1 | 35 | 70 |
| | | 2 | Heavy | 2 | 10 | 40 |
| | Large vibration influence | 6 | Light | 0.5 | 10 | 30 |
| | | 6 | Medium | 1 | 15 | 90 |
| | | 6 | Heavy | 2 | 5 | 60 |

| Storage case shift element | Carrier passage level | Weighting element 1 Location coefficient | Weighting element 2 Weight coefficient | | Passage count | Score |
|---|---|---|---|---|---|---|
| Shift due to carrier passage vibration | Upper level passage count | 0.002 | Light | 0.5 | 350 | 0.35 |
| | | 0.002 | Medium | 1 | 400 | 0.8 |
| | | 0.002 | Heavy | 2 | 200 | 0.8 |
| | Target level passage count | 0.005 | Light | 0.5 | 200 | 0.5 |
| | | 0.005 | Medium | 1 | 250 | 1.25 |
| | | 0.005 | Heavy | 2 | 100 | 1 |
| | Lower level passage count | 0.005 | Light | 0.5 | 300 | 0.75 |
| | | 0.005 | Medium | 1 | 275 | 1.375 |
| | | 0.005 | Heavy | 2 | 225 | 2.25 |

| Total Score | 411 |
|---|---|

Determination logic
< 500 OK

Fig.9

Weighting element 1 for vibration during transfer to/from shelf in double deep storage method Planar illustration ☐ ←Shelf not influenced by vibration

| Location element | | |
|---|---|---|
| Shared shelf | Passage-side shelf / Passage-side shelf | |
| Adjacent stacker crane | Crane passage | Target level |
| Shared shelf | Passage-side shelf / Passage-side shelf | |
| stacker crane | Crane passage | |
| Shared shelf | Passage-side shelf / Passage-side shelf | |
| Adjacent stacker crane | Crane passage | |
| | Passage-side shelf / Passage-side shelf | |

Within the target level region:
- Small influence | Moderate influence | Large influence | Moderate influence | Small influence
- Small influence | Moderate influence | Target shelf | Moderate influence | Small influence

Fig.10

| Storage case shift element | Transfer level | Weighting element 1 Location coefficient | Weighting element 2 Weight coefficient | | Count | Score |
|---|---|---|---|---|---|---|
| Shift due to transfer vibration | Small vibration influence | 0.2 | Light | 0.5 | 80 | 8 |
| | | 0.2 | Medium | 1 | 30 | 6 |
| | | 0.2 | Heavy | 2 | 15 | 6 |
| | Moderate vibration influence | 2 | Light | 0.5 | 25 | 25 |
| | | 2 | Medium | 1 | 35 | 70 |
| | | 2 | Heavy | 2 | 10 | 40 |
| | Large vibration influence | 6 | Light | 0.5 | 10 | 30 |
| | | 6 | Medium | 1 | 15 | 90 |
| | | 6 | Heavy | 2 | 5 | 60 |

| Storage case shift element | Carrier passage level | Weighting element 1 Location coefficient | Weighting element 2 Weight coefficient | | Passage count | Score |
|---|---|---|---|---|---|---|
| Shift due to crane passage vibration | Target level passage count | 0.005 | Light | 0.5 | 200 | 0.5 |
| | | 0.005 | Medium | 1 | 250 | 1.25 |
| | | 0.005 | Heavy | 2 | 100 | 1 |

| Total Score | 338 |
|---|---|

Determination logic
< 500 OK

Fig.12

| Storage case shift element | Transfer level | Weighting element 1 Location coefficient | Weighting element 2 Weight coefficient | | Count | Score |
|---|---|---|---|---|---|---|
| Shift due to transfer vibration | Small vibration influence | 0.2 | Light | 0.5 | 80 | 8 |
| | | 0.2 | Medium | 1 | 30 | 6 |
| | | 0.2 | Heavy | 2 | 15 | 6 |
| | Moderate vibration influence | 2 | Light | 0.5 | 25 | 25 |
| | | 2 | Medium | 1 | 35 | 70 |
| | | 2 | Heavy | 2 | 10 | 40 |
| | Large vibration influence | 6 | Light | 0.5 | 10 | 30 |
| | | 6 | Medium | 1 | 15 | 90 |
| | | 6 | Heavy | 2 | 5 | 60 |

| Storage case shift element | Carrier passage level | Weighting element 1 Location coefficient | Weighting element 2 Weight coefficient | | Passage count | Score |
|---|---|---|---|---|---|---|
| Shift due to crane passage vibration | Target level passage count | 0.005 | Light | 0.5 | 200 | 0.5 |
| | | 0.005 | Medium | 1 | 250 | 1.25 |
| | | 0.005 | Heavy | 2 | 100 | 1 |

| Total Score | | | | | | 338 |

Determination logic

< 500  OK

AUTOMATED WAREHOUSE SYSTEM, METHOD FOR CORRECTING MISALIGNMENT OF PLACEMENT POSITION OF ARTICLE IN AUTOMATED WAREHOUSE SYSTEM, COMPUTER PROGRAM, AND RECORDING MEDIUM

CROSS REFERENCE TO RELATED APPLICATION

This application claims priority to Japanese Patent Application No. 2021-056573 filed Mar. 30, 2021, the disclosure of which is hereby incorporated by reference in its entirety.

BACKGROUND OF THE INVENTION

1. Field of the Invention

The present invention relates to an automated warehouse system in which articles are automatically loaded to a storage rack and unloaded from a storage rack, a method for correcting misalignment of the placement position of an article in an automated warehouse system, a computer program, and a recording medium.

2. Description of the Related Art

This type of automated warehouse system normally includes a storage rack for articles, a transport device that transports articles from an inbound station to the storage rack as well as transports articles from the storage rack to an outbound station, and a control device that controls operations of the transport device.

The transport device includes a travel carrier, a transfer device, and the like, the transfer device is mounted on the travel carrier, and the transfer device transfers articles to shelves in the storage rack as well as transfers articles from the storage rack to itself.

The traveling of the travel carrier, the operation of the transfer device, and the like are controlled by the control device.

In such an automated warehouse system, it is common for articles to be frequently transferred to (loaded to) a storage rack and transferred from (unloaded from) a storage rack to the transfer device, and the travel carrier travels and the transfer device operates as the articles are loaded and unloaded. Accordingly, articles stored in the storage rack are constantly subjected to vibration that accompanies the traveling of the travel carrier and vibration that accompanies the transfer of articles by the transfer device, and are influenced by such vibration.

For this reason, an article that has remained in the storage rack for an extended period of time is sometimes greatly influenced by such vibration and shifts from the predetermined placement position to the extent that the article can no longer be unloaded from the storage rack by a transfer device, and such an inability for a transfer device to unload an article leads to major problems in the overall operation of the automated warehouse system.

An article storage rack described in Patent Document 1 (JP 2019-189409A) and an article storage rack described in Patent Document 2 (JP 2020-158216A) are examples of an automated warehouse system that addresses the vibration problems described above.

In the article storage rack described in Patent Document 1, a restricting member that restricts the placement position of an article stored in the storage rack is arranged on a shelf, and in order to attach the restricting member to the shelf, an engaging recessed portion is formed in the shelf, and an engaging protruding portion that engages with the engaging recessed portion is formed on the restricting member, for example.

Providing such a restricting member at each article placement position makes it possible to prevent an article that has been stored in the storage rack from shifting from the predetermined placement position.

Also, in the article storage rack described in Patent Document 2, the shelf portion has a dual-component structure including a shelf member and a frame member that supports the shelf member, and vibration that occurs during the traveling of a travel carrier is not likely to be directly transmitted from the traveling rail to an article stored in the storage rack.

SUMMARY OF THE INVENTION

In the case of the above-described automated warehouse systems, as the scale increases, it becomes necessary to be able to store from 10,000 to 100,000 articles, for example.

In the case of the article storage rack described in Patent Document 1, it is necessary to provide the restricting member at the placement positions for all of the 10,000 to 100,000 articles, and also form the engaging recessed portions in the shelves.

Moreover, the stored articles can have various sizes and shapes, and the arrangement locations of the restricting members need to be changed for each article size.

Accordingly, in the case of the article storage rack described in Patent Document 1, although it is possible to almost certainly prevent an article that has been stored in the storage rack from shifting from the predetermined placement position, there are problems such as that the production of the article storage rack takes time and effort, thus leading to a significant increase in the production cost of the article storage rack.

In the case of the article storage rack described in Patent Document 2 as well, the shelf portion needs to have a dual-component structure including a shelf member and a frame member that supports the shelf member, and thus similarly to the case of the article storage rack described in Patent Document 1, there are problems such as that the production of the article storage rack takes time and effort, and the material cost rises, thus leading to a significant increase in the production cost of the article storage rack.

Moreover, in the case of the article storage rack described in Patent Document 2, there remains a problem that it is difficult to reliably prevent an article that has been stored in the storage rack from shifting from the predetermined placement position.

The present invention has been made in view of the above problems, and an object of the present invention is to provide an automated warehouse system in which even if a stored article that has been placed at a predetermined placement position in a storage rack is subjected to vibration that accompanies article transfer performed by a transfer device or vibration that accompanies the traveling of a travel carrier, the placement position of the article does not shift from the predetermined placement position to the extent that the article cannot be unloaded from the storage rack, without leading to a significant increase in the production cost of the article storage rack, and to also provide a method for correcting misalignment of the placement position of an article in an automated warehouse system, a computer program, and a recording medium.

An automated warehouse system according to an aspect of the present invention includes:
- a storage rack for articles;
- a transport device configured to transport an article to the storage rack and transport an article from the storage rack; and
- a control unit configured to control an operation of the transport device,
- wherein the control unit includes:
  - a misalignment determination unit configured to determine, after storage of a first article in the storage rack, whether the first article is estimated to have been subjected to vibration exceeding a predetermined threshold value; and
  - a misalignment correction instruction unit configured to, in response to the misalignment determination unit estimating that the first article has been subjected to vibration exceeding the predetermined threshold value, output a control signal to the transport device to drive the transport device to perform a misalignment correction operation with respect to a placement position of the first article.

According to this automated warehouse system, after storage of an article in the storage rack, if it is estimated that the article has been subjected to vibration exceeding a predetermined threshold value, the transport device can be driven to perform the misalignment correction operation with respect to the placement position of the article, thus making it possible to reliably prevent the case where the placement position of the article becomes misaligned from a predetermined placement position for the article to the extent that the article can no longer be unloaded from the storage rack.

Moreover, it is not necessary to additionally provide the storage rack with a special structure such as in the case of the article storage rack described in Patent Document 1 or Patent Document 2, and misalignment can be addressed with merely a change in software processing performed in the control unit, thus preventing a significant rise in the production cost of the storage rack.

Also, a method for correcting misalignment of an article placement position in an automated warehouse system according to an aspect of the present invention is a method for correcting misalignment of a placement position of an article in an automated warehouse system,
the automated warehouse system including:
- a storage rack for articles;
- a transport device configured to transport an article to the storage rack and transport an article from the storage rack, and a control unit configured to control an operation of the transport device, the method causing the control unit to:
- determine, after storage of a first article in the storage rack, whether the first article is estimated to have been subjected to vibration exceeding a predetermined threshold value; and
- in response to estimation during the determining that the first article has been subjected to vibration exceeding the predetermined threshold value, output a control signal to the transport device to drive the transport device to perform a misalignment correction operation with respect to a placement position of the first article.

According to this method for correcting misalignment of the placement position of an article in an automated warehouse system, after storage of an article in the storage rack, if it is estimated that the article has been subjected to vibration exceeding a predetermined threshold value, the transport device can be driven to perform the misalignment correction operation with respect to the placement position of the article, thus making it possible to reliably prevent the case where the placement position of the article becomes misaligned from a predetermined placement position for the article to the extent that the article can no longer be unloaded from the storage rack.

Moreover, it is not necessary to additionally provide the storage rack with a special structure such as in the case of the article storage rack described in Patent Document 1 or Patent Document 2, and misalignment can be addressed with merely a change in software processing performed in the control unit, thus preventing a significant rise in the production cost of the storage rack.

Also, a computer program according to an aspect of the present invention is computer program for causing at least one computer to perform misalignment correction with respect to a placement position of an article in an automated warehouse system,
the computer program causing the at least one computer to:
- determine, after storage of a first article in the storage rack, whether the first article is estimated to have been subjected to vibration exceeding a predetermined threshold value; and
- in response to estimation during the determining that the first article has been subjected to vibration exceeding the predetermined threshold value, output a control signal to a transport device for transporting an article to drive the transport device to perform a misalignment correction operation with respect to a placement position of the first article.

According to this computer program, the at least one computer is caused to execute a misalignment correction instruction step of, after storage of an article in the storage rack, if it is estimated that the article has been subjected to vibration exceeding a predetermined threshold value, outputting a control signal to a transport device for transporting articles to drive the transport device to perform a misalignment correction operation with respect to the placement position of the article, thus making it possible to reliably prevent the case where the placement position of the article becomes misaligned from a predetermined placement position for the article to the extent that the article can no longer be unloaded from the storage rack.

Moreover, it is not necessary to additionally provide the storage rack with a special structure such as in the case of the article storage rack described in Patent Document 1 or Patent Document 2, and misalignment can be addressed with merely a change in software processing performed by the computer, thus preventing a significant rise in the production cost of the storage rack.

Also, a recording medium according to an aspect of the present invention has recorded thereon a computer program for causing at least one computer to perform misalignment correction with respect to a placement position of an article in an automated warehouse system,
the computer program causing the at least one computer to:
- determine, after storage of a first article in the storage rack, whether the first article is estimated to have been subjected to vibration exceeding a predetermined threshold value; and
- in response to estimation during the determining that the first article has been subjected to vibration exceeding the predetermined threshold value, output a control signal to a transport device for transporting an article to drive the transport device to perform a misalignment correction operation with respect to a placement position of the first article.

BRIEF DESCRIPTION OF THE DRAWINGS

FIG. 5 is a conceptual diagram in which the influence of vibration that accompanies transfer is evaluated for each of various transfer locations when a second article is transferred to the vicinity of a first shelf by a transfer device, according to Embodiment I.

FIG. 6 is a conceptual diagram in which the influence of vibration that accompanies transfer by a transfer device and the influence of vibration that accompanies the passage of a travel carrier are separately evaluated for cases where a second article is transferred to the vicinity of a first shelf by a transfer device, according to Embodiment I, and also shows an example of logic for making a precise determination regarding misalignment in consideration of the mechanism of article misalignment.

FIG. 7 is a conceptual diagram in which the influence of vibration that accompanies transfer is evaluated for each of various transfer locations when a second article is transferred to the vicinity of a first shelf by a transfer device, according to Embodiment II.

FIG. 8 is a conceptual diagram in which the influence of vibration that accompanies transfer by a transfer device and the influence of vibration that accompanies the passage of a travel carrier are separately evaluated for cases where a second article is transferred to the vicinity of a first shelf by a transfer device, according to Embodiment II, and also shows an example of logic for making a precise determination regarding misalignment in consideration of the mechanism of article misalignment.

FIG. 9 is a conceptual diagram in which the influence of vibration that accompanies transfer is evaluated for each of various transfer locations when a second article is transferred to the vicinity of a first shelf by a transfer device mounted on a lifting platform of a stacker crane, according to Embodiment III.

FIG. 10 is a conceptual diagram in which the influence of vibration that accompanies transfer and the influence of vibration that accompanies the passage of a lifting platform of a stacker crane are separately evaluated for cases where a second article is transferred to the vicinity of a first shelf by a transfer device mounted on the lifting platform of the stacker crane, according to Embodiment III, and also shows an example of logic for making a precise determination regarding misalignment in consideration of the mechanism of article misalignment.

FIG. 12 is a conceptual diagram in which the influence of vibration that accompanies transfer and the influence of vibration that accompanies the passage of a lifting platform of a stacker crane are separately evaluated for cases where a second article is transferred to the vicinity of a first shelf by a transfer device mounted on the lifting platform of the stacker crane, according to Embodiment IV, and also shows an example of logic for making a precise determination regarding misalignment in consideration of the mechanism of article misalignment.

DETAILED DESCRIPTION OF PREFERRED EMBODIMENTS

Hereinafter, embodiments of an automated warehouse system according to the present invention will be described with reference to the drawings.

The embodiments described below are merely examples of preferred embodiments of the present invention, are not intended to limit the present invention, and do not deny the possibility of other configurations in the automated warehouse system according to the present invention.

Overall Schematic Configuration of Automated Warehouse System

Figure 1:
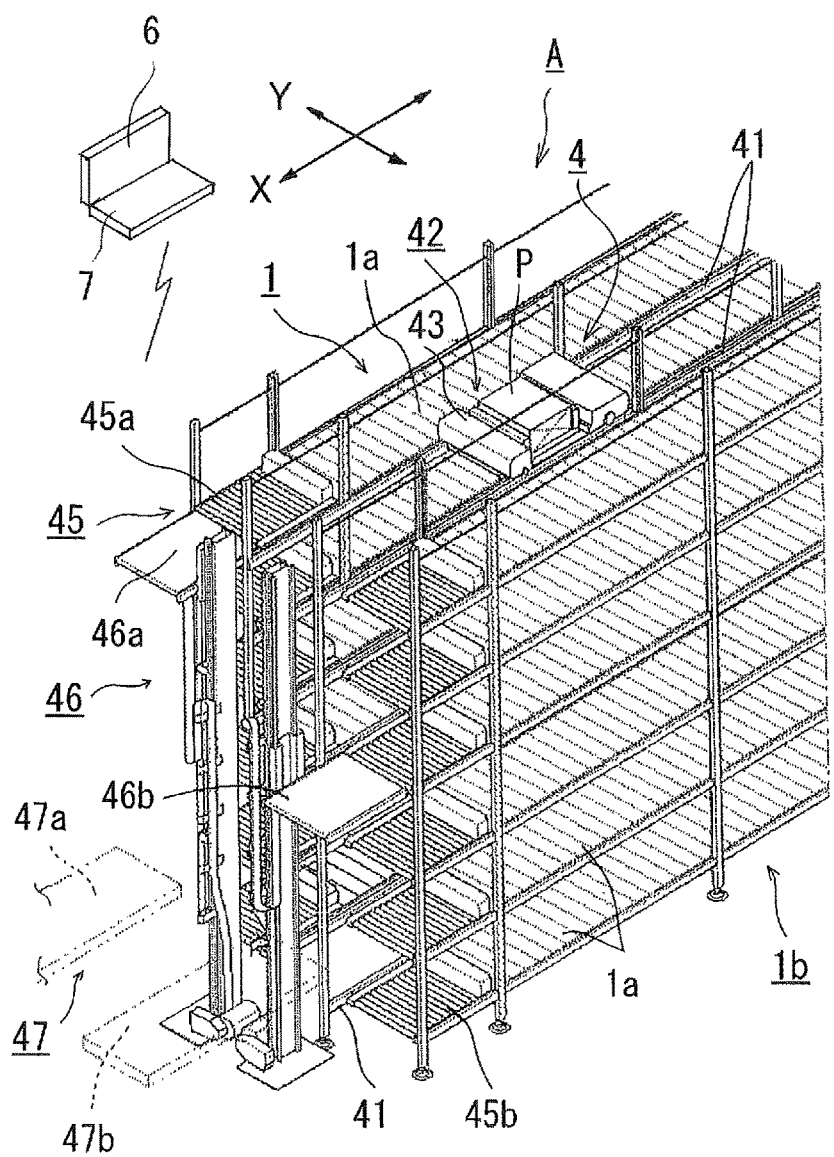
FIG. 1 is a perspective view showing an overall schematic configuration of an automated warehouse system according to an embodiment.

FIG. 1 is a perspective view showing the overall schematic configuration of an automated warehouse system according to an embodiment.

An automated warehouse system A includes an article storage rack 1, a transport device (shuttle type) 4 that transports an article P from an inbound station (not shown) to the storage rack 1 and transports an article P from the storage rack 1 to an outbound station (not shown), and a control unit 5 (see FIG. 3) that controls the operation of the transport device 4.

The transport device 4 includes traveling rails 41, a travel carrier 42, a transfer device 43, and the like, the transfer device 43 is mounted to the travel carrier 42, and the transfer device 43 transfers an article P from the travel carrier 42 to a shelf 1a of the storage rack 1, or from the shelf 1a of the storage rack 1 to the travel carrier 42.

The traveling of the travel carrier 42, the operation of the transfer device 43, and the like are controlled by the control unit 5.

Configuration of Article

The article P referred to here is a container for accommodating a product, and may be a container or a so-called foldable container, or a so-called case for accommodating a product.

The article P is prepared according to the product that is to be accommodated, and there are no particular limitations on the size, shape, or material.

The size of the article P may be as small as 20 cm on one side, or as large as 1 m or more on one side.

The article P normally has a hollow rectangular parallelepiped shape or a shape in which the upper surface of a hollow rectangular parallelepiped shape is omitted, but the shape of the article P is in no way limited to being a rectangular parallelepiped shape. Also, in order for the transfer device 43 to smoothly perform the transfer operation, the article P is often configured such that the bottom portion, which has a predetermined thickness, protrudes from the bottom surface of a main body portion that has a hollow rectangular parallelepiped shape. The area of the bottom portion in a plan view is set smaller than the area of the main body portion in a plan view.

There are no particular limitations on the material forming the article P, and it may be a resin material or a type of paper such as corrugated cardboard.

Configuration of Storage Rack

FIG. 1 is a perspective view showing the overall schematic configuration of the automated warehouse system A that includes the storage rack 1 for articles P, and the storage rack 1 includes shelves 1a on which articles P are placed for storage, and a frame body 1b that supports the shelves 1a.

Also, portions of the frame body 1b also function as the traveling rails 41 along which the travel carrier 42 travels.

A pair of storage racks 1 extend along the traveling rails 41 and are arranged spaced apart on opposite sides of the traveling rails 41. The number of provided pairs is determined according to the number of articles P that are to be handled, and is sometimes as small as one pair, and sometimes as many as around ten pairs.

Also, the number of shelves 1a is also determined according to the number and size of articles P that are to be handled, but in the case of the illustrated embodiments, there are six shelves 1a.

The storage rack 1 is often of a single deep type according to which a first article P can be placed on a shelf 1a by being moved in the depth direction (Y direction) from the traveling rail 41, or of a double deep type according to which two articles P can be placed on a shelf 1a by being moved in the depth direction.

Configuration of Transport Device

The transport device 4 is often a shuttle type (FIG. 1) or a stacker crane type (FIG. 2) of device.

First, the shuttle type of device shown in FIG. 1 will be described.

In the case of a shuttle type of device, one travel carrier 42 is provided for each level of shelves 1a in the storage rack 1.

The transport device 4 includes the traveling rails 41, the travel carrier 42, the transfer device 43, and the like, the transfer device 43 is mounted to the travel carrier 42, and the transfer device 43 transfers an article P from the travel carrier 42 to a shelf 1a of the storage rack 1, or from a shelf 1a of the storage rack 1 to the travel carrier 42.

The transport device 4 further includes a loading/unloading relay conveyor 45, a loading/unloading lift device 46, and a loading/unloading conveyor 47 that are for loading an article P to the storage rack 1 and unloading an article P from the storage rack 1.

The loading/unloading relay conveyor 45 includes a loading relay conveyor 45a used for loading an article P to the storage rack 1 and an unloading relay conveyor 45b used for unloading an article P from the storage rack 1. A plurality of sets (six sets in the illustrated embodiments) of loading/unloading relay conveyors 45, each of which includes the loading relay conveyor 45a and the unloading relay conveyor 45b, are arranged side by side in the up-down direction with gaps therebetween in the illustrated Y direction, in accordance with the number of levels of shelves 1a in the storage rack 1.

The loading/unloading lift device 46 includes a loading lift device 46a and an unloading lift device 46b.

The loading/unloading conveyor 47 includes a loading conveyor 47a and an unloading conveyor 47b.

According to the transport device 4 having the above-described configuration, articles P received from the loading conveyor 47a are distributed to corresponding loading relay conveyors 45a by the loading lift device 46a. An article P distributed to a loading relay conveyor 45a is placed on the transfer device 43 of the travel carrier 42 provided at the same level, and is transported to a predetermined shelf 1a specified by the control unit 5.

In the case of unloading, an article P on a shelf 1a is placed on the transfer device 43 of a travel carrier 42 and transported to the unloading relay conveyor 45b provided at the same level. The article P is then transported to the unloading conveyor 47b by the unloading lift device 46b.

The operations for loading and unloading articles P with use of the travel carrier 42, the transfer device 43, the loading/unloading relay conveyor 45, the loading/unloading lift device 46, and the loading/unloading conveyor 47 are all controlled by the control unit 5, and are performed automatically.

Next, a stacker crane type of transport device will be described.

Figure 2:
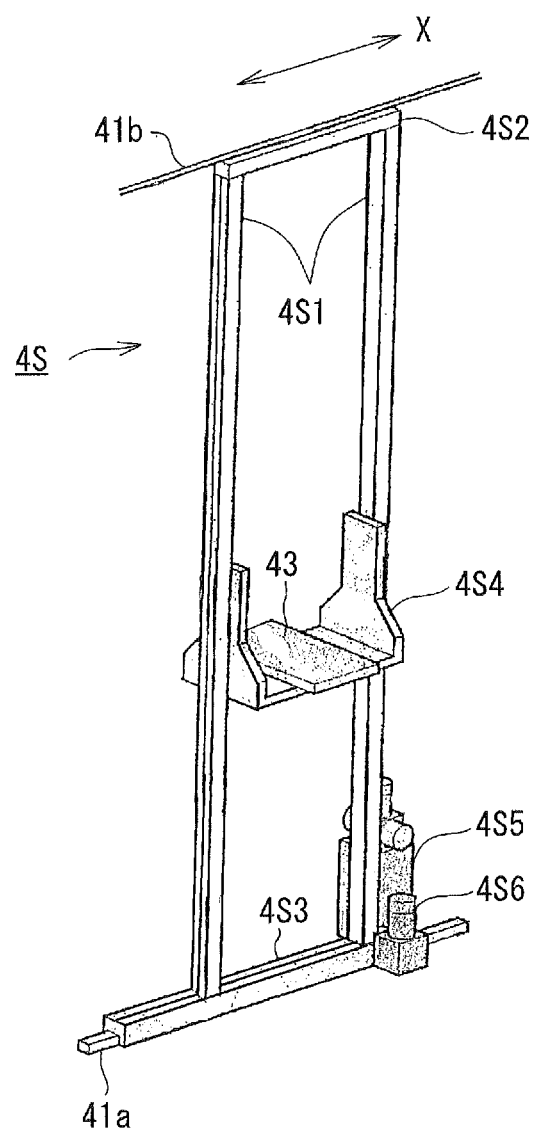
FIG. 2 is a perspective view showing a schematic configuration of a stacker crane type transport device according to an embodiment.

A stacker crane type of transport device 4S shown in FIG. 2 is provided with two upright guide frames 4S1 called masts, and also includes an upper frame 4S2 and a lower frame 4S3 that respectively connect the upper ends and the lower ends of the guide frames 4S1.

The transport device 4S includes a lifting platform 4S4 that can move up and down between the guide frames 4S1, a lifting device 4S5 that is attached to a lower portion of the guide frame 4S1 and moves the lifting platform 4S4 up and down, and a transfer device 43 that is mounted on the lifting platform 4S4.

Also, wheels (not shown) and a traveling device 4S6 for allowing the guide frame 4S1 to travel back and forth in the depth direction (X direction) of the storage rack 1 are attached to the lower frame 4S3 portion.

The stacker crane type of transport device 4S rides on a traveling rail 41a via the wheels, and the upper frame 4S2 is slidably coupled to the upper traveling rail 41b that is integrated with the storage rack 1.

In the case of the stacker crane type of transport device 4S, the traveling rail 41a extends in the depth direction (X direction) of the storage rack 1, and the lifting platform 4S4 on which the transfer device 43 is mounted can move up and down between the guide frames 4S1, and therefore one stacker crane type of transport device 4S can be used for a pair of storage racks 1 that extend along the traveling rails 41a and are arranged spaced apart on opposite sides of the traveling rail 41a.

Accordingly, the stacker crane type of transport device 4S has an advantage of being able to be manufactured more inexpensively than the above-described shuttle type of transport device 4 that requires the same number of travel carriers 42 and transfer devices 43 as the number of levels in the storage rack 1.

The stacker crane type of transport device 4S also has an advantage of being able to be manufactured more inexpensively due to not needing a loading/unloading relay conveyor 45, a loading/unloading lift device 46, and the like.

Note that in terms of the processing speed of loading/unloading articles P, a shuttle type of device is advantageous due to the provision of more transport devices 4, and shuttle-type transport devices 4 are often used in mail-order automated warehouse systems or the like in which a very large number of articles P need to be loaded and unloaded every day.

Configuration of Control Unit

Figure 3:
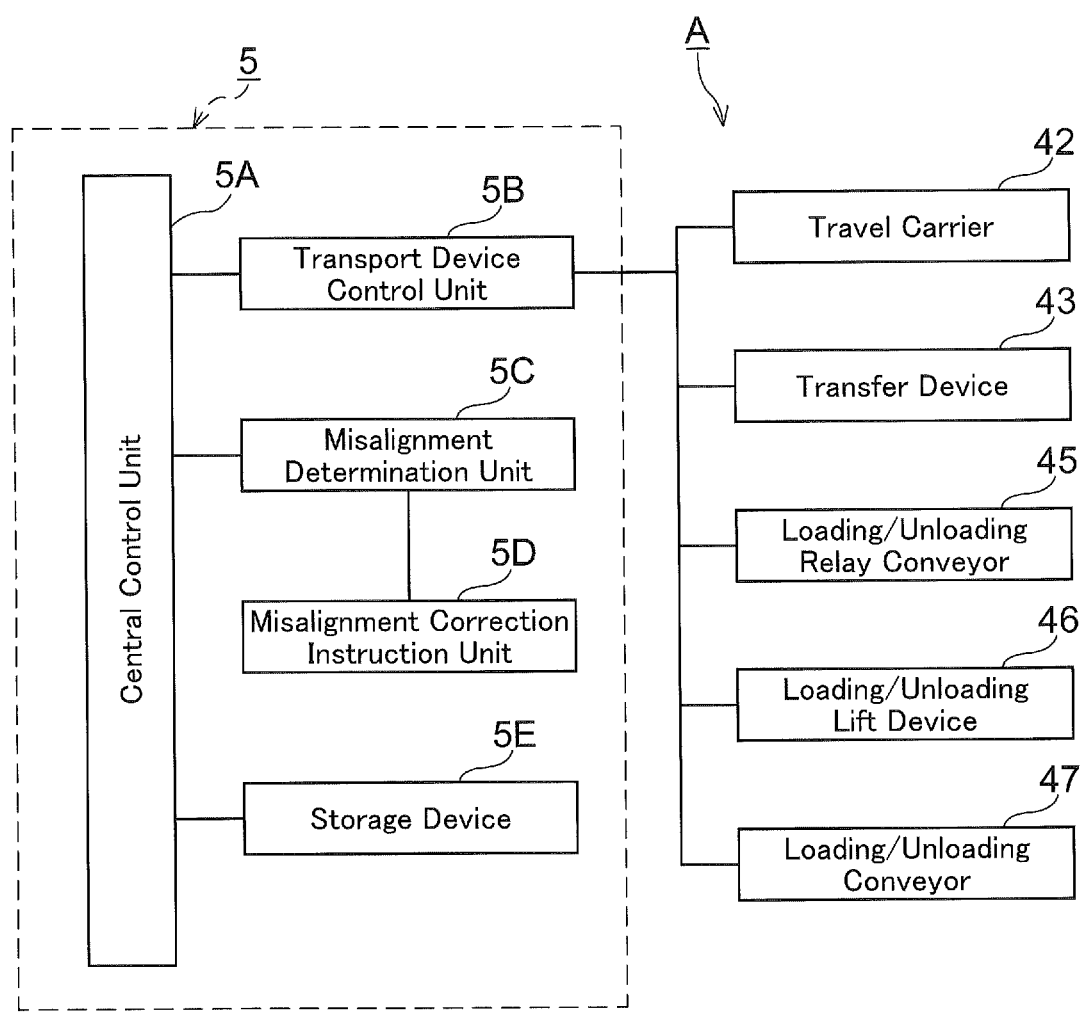
FIG. 3 is a block diagram showing a control unit in an automated warehouse system according to an embodiment.

FIG. 3 is a block diagram showing the control unit 5 in the automated warehouse system A according to an embodiment, and the control unit 5 may be constituted by, for example, a general-purpose personal computer that includes a central processing unit and storage devices such as a hard disk, a ROM, and a RAM, and has dedicated software installed therein.

The control unit 5 is configured by communicably connecting a transport device control unit 5B, a misalignment determination unit 5C, a misalignment correction instruction unit 5D, and a storage device 5E to a central control unit 5A.

The transport device control unit 5B is connected to the travel carrier 42, the transfer device 43, the loading/unloading relay conveyor 45, the loading/unloading lift device 46, the loading/unloading conveyor 47, and the like, and the control of all of such devices is executed using control signals that are transmitted from the transport device control unit 5B to all of such devices.

After an article P is stored in the storage rack 1, the misalignment determination unit 5C determines whether or not it can be estimated that the article P has been subjected to vibration at a level exceeding a predetermined threshold value. In the present embodiment, the misalignment determination unit 5C determines whether or not it can be estimated that the article P has been subjected to vibration exceeding a predetermined threshold value, based on a determination result regarding misalignment of the article P. Specifically, the misalignment determination unit 5C determines misalignment (the possibility of misalignment) of an article P based on a later-described score (misalignment score), and estimates that the article P has been subjected to vibration exceeding a predetermined threshold value if the score reaches a score threshold value (score-related threshold value) or the score exceeds the score threshold value.

If the misalignment determination unit 5C estimates/determines that the article P has been subjected to vibration at a level exceeding a predetermined threshold value, the misalignment correction instruction unit 5D executes a misalignment correction operation with respect to the placement position of the article P by outputting control signals to the travel carrier 42, the transfer device 43, and the like of the transport device 4 so as to drive the travel carrier 42, the transfer device 43, and the like.

For example, the misalignment determination unit 5C estimates/determines misalignment of a first article P by counting the number of times that a second article P has been transferred to the vicinity of the placement position of a first article P on a shelf 1a at the same level as the placement position of the first article P.

After the first article P is stored in the storage rack 1, misalignment is estimated by counting the number of times that a second article P is transferred to the vicinity of the placement position of the first article P, on a shelf 1a at the same level as the placement position of the first article P, which is where the first article P is thought to be most influenced by vibration, thus making it possible to efficiently and reliably estimate misalignment of the first article P from the predetermined placement position.

Also, when estimating misalignment, the misalignment determination unit 5C also adds, to the number of transfers, a location coefficient that takes into consideration the transfer location of a second article P on a shelf 1a at the same level as the placement position of the first article P.

The influence that vibration caused by the transfer of a second article P has on the first article P differs depending on the transfer location of the second article P. Therefore, by adding, to the number of transfers, a location coefficient that takes into consideration the transfer location of the second articles P when estimating misalignment, the estimation of the influence of vibration caused by the transfer of other articles P can be brought closer to the actual situation.

The misalignment determination unit 5C can also estimate misalignment by not only counting the number of times that a second article P has been transferred to a shelf 1a at the same level as the placement position of the first article P, but also counting the number of times that another article P has been transferred to the vicinity of the placement position of the first article P on a shelf 1a at a level above or below (upper or lower shelf) the level of the first article P.

Even when another article P is transferred to a shelf 1a above or below the shelf 1a on which the first article P is placed, the first article P is affected by such vibration. For this reason, if misalignment is estimated by not only counting the number of times that a second article P has been transferred to a shelf 1a at the same level as the placement position of the first article P, but also counting the number of times that another article P has been transferred to the vicinity of the placement position of the first article P on a shelf 1a at a level above or below the level of the first article P, the estimation of the influence that vibration caused by the transfer of other articles P has on the article P can be brought closer to the actual situation.

When estimating misalignment, the misalignment determination unit 5C also counts the number of times that a travel carrier 42 travels on the traveling rail 41 at the same level as the placement position of the first article P.

Vibration always occurs in the traveling rail 41 when the travel carrier 42 travels on the traveling rail 41.

Also, the traveling rail 41 is constituted by a portion of the frame body 1b that supports the shelf 1a, and in the storage rack 1, vibration occurring in the traveling rail 41 is always transmitted to the shelf 1a.

Accordingly, by counting the number of times that the travel carrier 42 travels on the traveling rail 41 at the same level as the placement position of the first article P when estimating misalignment, it is possible to give consideration not only to the influence of vibration caused by the transfer of other articles P, but also to the influence of vibration caused by the traveling of the travel carrier 42 on the traveling rail 41 when making the misalignment determination.

When estimating misalignment, the misalignment determination unit 5C not only counts the number of times that the travel carrier 42 travels on the traveling rail 41 at the same level as the placement position of the first article P, but also counts the number of times that a travel carrier 42 travels on a traveling rail 41 at a level above or below the level at which the first article P is placed.

The first article P is also influenced by vibration when a travel carrier 42 travels on a traveling rail 41 at a level above or below the level at which the first article P is placed.

For this reason, by not only counting the number of times that the travel carrier 42 travels on the traveling rail 41 at the same level as the placement position of the first article P, but also counting the number of times that a travel carrier 42 travels on a traveling rail 41 at a level above or below the level at which the first article P is placed when estimating misalignment, the influence of vibration caused by the traveling of travel carriers 42 can be more realistically reflected in the misalignment determination.

Also, if the transport device 4S is of a stacker crane type, the misalignment determination unit 5C counts the number of times a lifting platform has passed the same level as the placement position of the article P when estimating misalignment.

If the transport device 4S is of a stacker crane type, the frame body 1b of the storage rack 1 does not also serve as the traveling rail 41 of the travel carrier 42, and thus the influence of vibration caused by the traveling of the transport device 4S is smaller than in the case of the shuttle type of transport device 4.

However, even with the stacker crane type of transport device 4S, the upper traveling rail 41b is coupled to the frame body 1b of the storage rack 1, and it is not the case that vibration caused by the traveling of the transport device 4S has no influence at all on the storage rack 1.

Accordingly, by counting the number of times that the lifting platform 4S4 has passed the same level as the placement position of the article P when estimating misalignment, the influence of vibration caused by the lifting platform 4S4 of the stacker crane passing the vicinity of the placement position of the article P can also be taken into consideration when making the misalignment determination.

The misalignment determination unit 5C also gives consideration to the weight of another article P transported by the transport device 4 or 4S when estimating/determining misalignment.

Both when a second article P is transferred and when the transport device 4 or 4S travels, the amount vibration applied to a placed article P is greatly influenced by the weight of the second article P.

Due to the misalignment determination unit 5C also giving consideration to the influence of the weight of a second article P, the estimation of the influence that vibration has on the placed article P can be brought closer to the actual situation.

Also, in the case where the storage rack 1 for the article P is of a single deep type, the logic used by the misalignment determination unit 5C to estimate that the article P has been subjected to vibration exceeding a predetermined threshold value is presumed to be optimized for the storage rack 1 of the single deep type. This optimization is performed at least by selection of the location coefficient (e.g., mainly by selection of the location coefficient). In the example shown in FIG. 6 which will be referenced later, this optimization is performed by selection of the location coefficient and selection of a weight coefficient.

Accordingly, the automated warehouse system A can be optimized for the storage rack 1 of the single deep type.

Also, in the case where the storage rack 1 for the article P is of a double deep type, the logic used by the misalignment determination unit 5C to estimate that the article P has been subjected to vibration exceeding a predetermined threshold value is presumed to be optimized for the storage rack 1 of the double deep type. This optimization is performed at least by selection of the location coefficient (e.g., mainly by selection of the location coefficient). In the example shown in FIG. 8 which will be referenced later, this optimization is performed by selection of the location coefficient and selection of the weight coefficient.

Accordingly, the automated warehouse system A can be optimized for the storage rack 1 of the double deep type.

If the misalignment determination unit 5C estimates/determines that the article P has been subjected to vibration exceeding a predetermined threshold value, the misalignment correction instruction unit 5D executes a misalignment correction operation with respect to the placement position of the article P by outputting control signals to the travel carrier 42, the transfer device 43, and the like of the transport device 4 so as to drive the travel carrier 42, the transfer device 43, and the like.

This misalignment correction operation is realized by a pseudo transfer operation performed by the transfer device 43 mounted on the transport device 4, for example. The pseudo transfer operation is, for example, an operation of re-transferring the article P from the transfer device 43 to the storage rack 1 (shelf 1a) (pseudo unloading/loading operation). In this case, the pseudo transfer operation includes an operation of transferring the article P from the storage rack 1 to the transfer device 43 (pseudo unloading operation) and an operation of transferring the article P from the transfer device 43 to the storage rack 1 (e.g., the location where the article P had been placed on the shelf 1a) (pseudo loading operation).

As a result, the execution of the misalignment correction operation can be completed in a short time.

Also, in the case where the transfer device 43 mounted on the transport device 4 or 4S is of a single deep type, the pseudo transfer operation performed by the transfer device 43 is presumed to be optimized for the transfer device of the single deep type.

In the case where the transfer device 43 is of a single deep type, if the pseudo transfer operation performed by the transfer device 43 is optimized for the transfer device 43 of the single deep type, it is possible to realize a system in which the pseudo transfer operation can be completed in a shorter time.

Also, in the case where the transfer device 43 mounted on the transport device 4 or 4S is of a double deep type, the pseudo transfer operation performed by the transfer device 43 is presumed to be optimized for the transfer device of the double deep type.

In the case where the transfer device 43 is of a double deep type, if the pseudo transfer operation performed by the transfer device 43 is optimized for the transfer device 43 of the double deep type, it is possible to realize a system in which the pseudo transfer operation can be completed in a shorter time even if the transfer device 43 is of a double deep type.

This misalignment correction operation is realized by a pseudo loading/unloading operation performed by the transport device 4 or 4S, for example.

Accordingly, the misalignment correction operation can be performed reliably and accurately.

Figure 4:
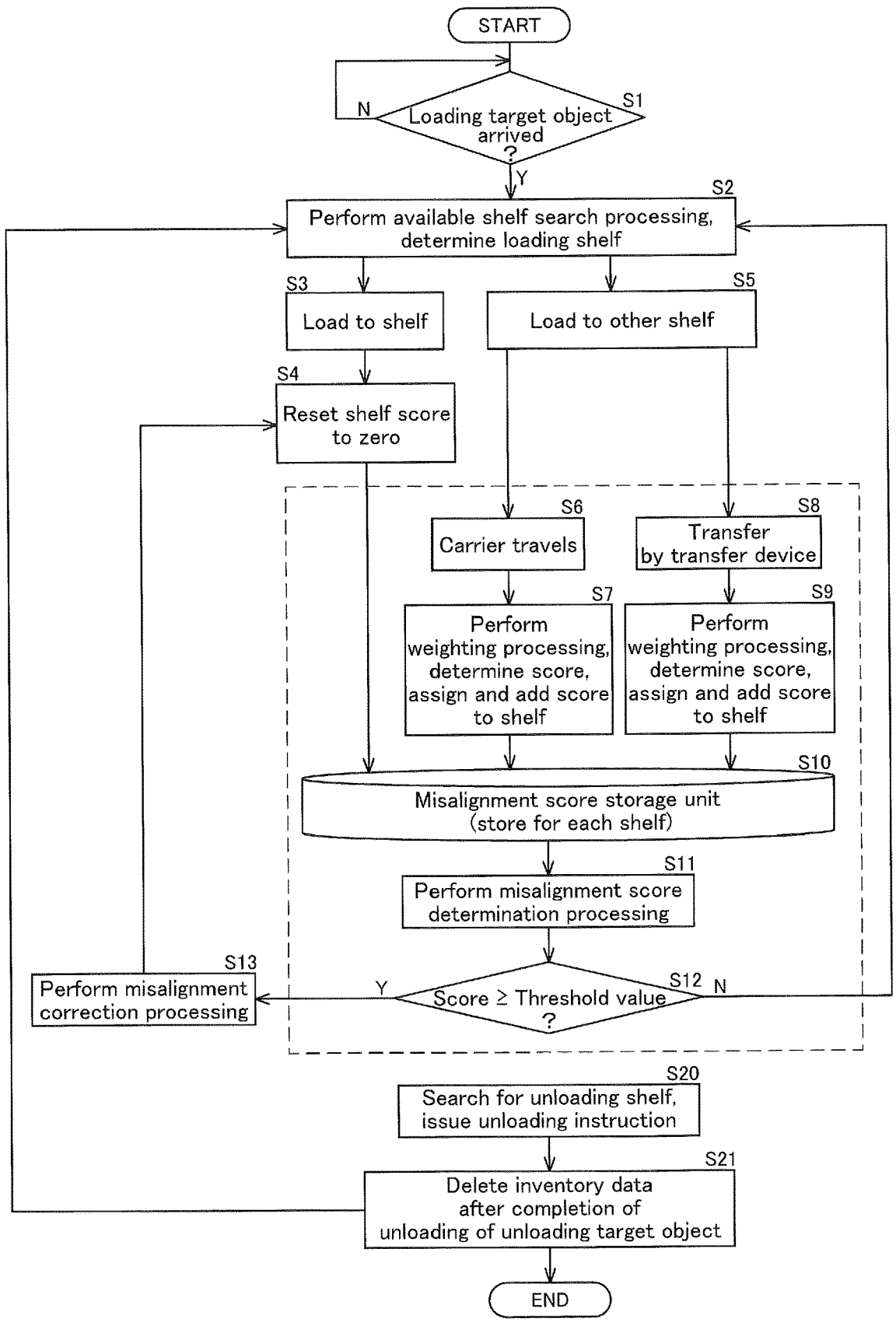
FIG. 4 is a flowchart showing operations of the control unit in the automated warehouse system according to an embodiment.

Next, an overview of the misalignment correction operation performed in the control unit 5 will be described with reference to the flowchart shown in FIG. 4. Note that a computer program for causing at least one computer to execute the misalignment correction processing with respect to the placement position of the article P in the automated warehouse system A is provided via a recording medium such as an optical disk or a flash memory (a non-transitory computer-readable recording medium), or is provided via a communication network, for example. The provided program is stored in a storage device that can be accessed by the computer.

First, in step S1, the control unit 5 determines whether or not a loading target object has arrived at the inbound station.

The control unit 5 is configured to be aware of loading schedule information for articles P and unloading schedule information for articles P, which is transmitted to the automated warehouse system A, and the arrival of the loading target object can be recognized by utilizing such information as well as information from various sensors provided in the automated warehouse system A.

If it is determined in step S1 that a loading target object has arrived at the inbound station, processing moves to step S2, and in step S2, available shelf search processing is performed, and a loading shelf is determined for the loading target object.

Various conditions are taken into consideration when determining the loading shelf. For example, the type of loading target object, the shipping destination, the scheduled unloading time, and the like are taken into consideration when determining the loading shelf.

When the loading shelf of the loading target object has been determined in step S2, processing moves to step S3 in which the control unit 5 drives the loading/unloading conveyor 47, the loading/unloading lift device 46, the loading/unloading relay conveyor 45, the travel carrier 42, the transfer device 43, and the like so as to load the loading target object to the determined loading shelf.

When the loading target object has been loaded to the determined loading shelf, processing moves to step S4, and in step S4, a score value for starting misalignment determination with respect to that article P on the determined loading shelf (first shelf) is reset to zero. Processing then moves to step S10.

On the other hand, if it is determined in step S2 that the loading target object is to be loaded to a loading shelf that is different from the first shelf, processing moves to step S5 in which the control unit 5 drives the loading/unloading conveyor 47, the loading/unloading lift device 46, the loading/unloading relay conveyor 45, the travel carrier 42, the transfer device 43, and the like toward a shelf other than the first shelf so as to load the loading target object to the shelf other than the first shelf.

Next, processing moves to step S6, and in step S6, the control unit 5 detects the traveling statuses of the travel carriers 42, such as the positions at which the travel carriers at the various levels are located.

Next, processing moves to step S7 in which the control unit 5 detects the occurrence status of vibration that accompanies the traveling statuses of the travel carriers 42 in step S6, executes weighting processing for the traveling statuses of the travel carriers 42, performs score determination, performs score assignment with respect to the first shelf, and performs score addition.

On the other hand, on the line from step S5 to step S8, in step S8, the control unit 5 detects the transfer statuses of articles P transferred by the transfer device 43, such as the locations and levels at which articles P have been transferred to shelves 1a.

Next, processing moves from step S8 to step S9, and in step S9, the control unit 5 detects the occurrence status of vibration that accompanies the transfer of articles P by the transfer device 43 in step S8, executes weighting processing for the transfer of articles P by the transfer device 43, performs score determination, performs score assignment with respect to the first shelf, and performs score addition.

Processing then moves from step S7 and step S9 to step S10, and in step S10, a misalignment estimation score value is stored in the storage device 5E for each shelf.

Next, processing moves from step S10 to step S11, and in step S11, misalignment estimation/determination processing is performed for each shelf by comparing the misalignment estimation score value of the shelf with a threshold value, and shelves for which the score value exceeds the threshold value are extracted.

Next, processing moves from step S11 to step S12, and if it is determined in step S12 that a shelf is an extracted shelf for which it was determined in step S11 that the misalignment estimation score value exceeds the threshold value, processing moves to step S13 in order to execute misalignment correction processing.

Processing then moves to step S13, and misalignment correction processing is executed in step S13.

Misalignment correction processing is realized by a pseudo transfer operation performed by the transfer device 43 mounted on the transport device 4, for example.

Alternatively, misalignment correction processing may be realized by a pseudo unloading/loading operation performed by the transport device 4, for example.

After misalignment correction processing is executed in step S13, processing returns to step S4, and the misalignment score value is reset to zero in step S4.

On the other hand, if it is determined for the shelf in step S12 that the misalignment estimation score value has not reached the threshold value, processing returns to step S2.

Also, if an unloading instruction is input via an input unit 7 of the personal computer, the unloading target shelf and article P are searched for, and in order to unload the article P, unloading processing for the article P is executed by driving the travel carrier 42, the transfer device 43, the loading/unloading relay conveyor 45, the loading/unloading lift device 46, the loading/unloading conveyor 47, and the like (step S20).

When unloading processing for the article P in step S20 is complete, processing moves to step S21, inventory data for that article P is deleted in step S21, and then processing returns to step S2.

When the processing of step S20 and step S21 has been executed and article P unloading processing is complete for all of the shelves, processing in the automated warehouse system A is ended.

The following is a more detailed description of embodiments of the automated warehouse system A by way of examples of specific cases.

Embodiment I: Case of Shuttle Type of Transport Device and Single Deep Type of Article P Shelf Placement Method FIG. 5 shows an example of a conceptual diagram in which the influence of vibration that accompanies transfer when a second article P is transferred to the vicinity of a first shelf by the transfer device 43 is evaluated for each transfer location.

In the present embodiment, the shelf 1a of the storage rack 1 is of a single deep type, and the transfer device 43 is also of a single deep type.

If a second article P is transferred to a left or right adjacent shelf at the same level as a first shelf (i.e., target level), the influence of the transfer is estimated to be the largest, whereas if a second article P is transferred to a shelf to the left or the right of the left/right adjacent shelf, the influence of transfer is estimated to be moderate.

If a second article P is transferred to a shelf at a level above or below the first shelf, the influence of the transfer is estimated to be the smallest.

If a second article P is transferred to a shelf other than those described above, the influence of the transfer is estimated to be negligible.

FIG. 6 is a conceptual diagram in which the influence of vibration that accompanies transfer and the influence of vibration that accompanies the passage of a travel carrier 42 are separately evaluated for cases where a second article P is transferred to the vicinity of a first shelf by a transfer device 43, and also shows an example of logic for making a precise determination regarding misalignment of the first article P.

The upper table section shows the influence of vibration that accompanies the transfer of a second article P to the vicinity of the first shelf by the transfer device 43, and also shows the influence of the weight of the second article P that is to be transferred.

For example, in the case of the influence of vibration that accompanies the transfer of a second article P to the vicinity of the first shelf by the transfer device 43, as the location element indicating the positional relationship with the first shelf, a location coefficient of 0.2 is given for a location where the influence is determined to be small, a location coefficient of 2 is given for a location where the influence is determined to be moderate, and a location coefficient of 6 is given for a location where the influence is determined to be large.

Also, in the case of the influence of the weight of the second article P, a weight coefficient of 0.5 is given in the case of light weight, a weight coefficient of 1 is given in the case of medium weight, and a weight coefficient of 2 is given in the case of heavy weight.

The number of transfers is further added to the location coefficient and the weight coefficient to obtain corresponding scores.

The lower table section shows the case where the influence of vibration that accompanies the passage of a travel carrier 42 is taken into consideration. If a travel carrier 42 passes the same level as the first shelf, a location coefficient of 0.005 is given; if a travel carrier 42 passes the level below the first shelf, a location coefficient of 0.005 is also given; and if a travel carrier 42 passes the level above the first shelf, a location coefficient of 0.002 is given.

Also, in the case of the influence of the weight of the second article P, the numerical values given in the case of the above transfer are adopted as-is.

The number of passes is further added to the location coefficient and the weight coefficient to obtain corresponding scores.

The values are given and added up each time a transfer device 43 performs transfer and a travel carrier 42 passes as described above, and thus corresponding scores are calculated.

As one example, if the summed value (total value) of a score reaches 500 or more, it is determined that the timing for performing misalignment correction has been reached, a misalignment correction instruction is issued in order to execute the misalignment correction operation, and the misalignment correction operation is executed.

When the misalignment correction operation is executed, the score of the first shelf is reset to 0.

Embodiment II: Case of Shuttle Type of Transport Device and Double Deep Type of Article P Shelf Placement Method FIG. 7 shows an example of a conceptual diagram in which the influence of vibration that accompanies transfer when a second article P is transferred to the vicinity of the first shelf by the transfer device 43 is evaluated for each transfer location.

In the present embodiment, the shelf 1*a* of the storage rack 1 is of a double deep type, and the transfer device 43 is also of a double deep type.

If a second article P is transferred to a passage-side shelf at the same level as the first shelf (i.e., a shelf on the side on which travel carrier passes), the influence of the transfer is estimated to be the largest, whereas if a second article P is transferred to a shelf to the left or the right of the first shelf and the passage-side shelf, the influence of transfer is estimated to be moderate.

If a second article P is transferred to a shelf at a level above or below the first shelf, the influence of the transfer is estimated to be the smallest.

If a second article P is transferred to a shelf other than those described above, the influence of the transfer is estimated to be negligible.

FIG. 8 is a conceptual diagram in which the influence of vibration that accompanies transfer and the influence of vibration that accompanies the passage of a travel carrier 42 are separately evaluated for cases where a second article P is transferred to the vicinity of a first shelf by a transfer device 43, and also shows an example of logic for making a precise determination regarding misalignment of the first article P.

The upper table section shows the influence of vibration that accompanies the transfer of a second article P to the vicinity of the first shelf by the transfer device 43, and also shows the influence of the weight of the second article P that is to be transferred.

For example, in the case of the influence of vibration that accompanies the transfer of a second article P to the vicinity of the first shelf by the transfer device 43, as the location element indicating the positional relationship with the first shelf, a location coefficient of 0.2 is given for a location where the influence is determined to be small, a location coefficient of 2 is given for a location where the influence is determined to be moderate, and a location coefficient of 6 is given for a location where the influence is determined to be large.

Also, in the case of the influence of the weight of the second article P, a weight coefficient of 0.5 is given in the case of light weight, a weight coefficient of 1 is given in the case of medium weight, and a weight coefficient of 2 is given in the case of heavy weight.

The number of transfers is further added to the location coefficient and the weight coefficient to obtain corresponding scores.

The lower table section shows the case where the influence of vibration that accompanies the passage of a travel carrier 42 is taken into consideration.

If a travel carrier 42 passes the same level as the first shelf, a location coefficient of 0.005 is given; if a travel carrier 42 passes the level below the first shelf, a location coefficient of 0.005 is also given; and if a travel carrier 42 passes the level above the first shelf, a location coefficient of 0.002 is given.

Also, in the case of the influence of the weight of the second article P, numerical values similar to those given in the case of the above transfer by the transfer device 43 are adopted as-is.

The number of passes is further added to the location coefficient and the weight coefficient to obtain corresponding scores.

The values are given and added up each time a transfer device 43 performs transfer and a travel carrier 42 passes as described above, and thus corresponding scores are calculated.

As one example, if the summed value (total value) of a score reaches 500 or more, it is determined that the timing for performing misalignment correction has been reached, a misalignment correction instruction is issued in order to execute the misalignment correction operation, and the misalignment correction operation is executed.

When the misalignment correction operation is executed, the score of the first shelf is reset to 0.

Embodiment III: Case of Stacker Crane Type of Transport Device, Single Deep Type of Article P Shelf Placement Method, Double Deep Type of Shelf, and Sharing of Shelf with Adjacent Lane FIG. 9 shows an example of a conceptual diagram in which the influence of vibration that accompanies transfer is evaluated for each of various transfer locations when a second article P is transferred to the vicinity of a first shelf by a transfer device 43 mounted on a lifting platform of a stacker crane.

In the present embodiment, the shelf 1a of the storage rack 1 is of a double deep type, but the article P shelf placement method is of a single deep type, the transfer device 43 mounted on the stacker crane is also of a single deep type, and the shelves 1a are shared with an adjacent lane.

If a second article P is transferred to a passage-side shelf that is adjacent to the first shelf at the same level as the first shelf (i.e., an adjacent shelf on the side where the stacker crane passes), the influence of the transfer is estimated to be the largest, whereas if a second article P is transferred to a shelf to the left or the right of the first shelf and the adjacent passage-side shelf, the influence of transfer is estimated to be moderate.

If a second article P is transferred to a shelf on the left or right side of the left/right adjacent shelf, the influence of transfer is estimated to be the smallest.

If a second article P is transferred to a shelf other than those described above, the influence of the transfer is estimated to be negligible.

FIG. 10 is a conceptual diagram in which the influence of vibration that accompanies transfer and the influence of vibration that accompanies the passage of a lifting platform of a stacker crane are separately evaluated for cases where a second article P is transferred to the vicinity of a first shelf by a transfer device 43 mounted on the lifting platform of the stacker crane, and also shows an example of logic for making a precise determination regarding misalignment of the article P.

The upper table section shows the influence of vibration that accompanies the transfer of a second article P to the vicinity of the first shelf by the transfer device 43 mounted on the lifting platform, and also shows the influence of the weight of the second article P that is to be transferred.

For example, in the case of the influence of vibration that accompanies the transfer of a second article P to the vicinity of the first shelf by the transfer device 43, as the location element indicating the positional relationship with the first shelf, a location coefficient of 0.2 is given for a location where the influence is determined to be small, a location coefficient of 2 is given for a location where the influence is determined to be moderate, and a location coefficient of 6 is given for a location where the influence is determined to be large.

Also, in the case of the influence of the weight of the second article P, a weight coefficient of 0.5 is given in the case of light weight, a weight coefficient of 1 is given in the case of medium weight, and a weight coefficient of 2 is given in the case of heavy weight.

The number of transfers is further added to the location coefficient and the weight coefficient to obtain corresponding scores.

The lower table section shows the case where the influence of vibration that accompanies the passage of the lifting platform of the stacker crane is taken into consideration.

If the lifting platform passes the same level as the first shelf, a location coefficient of 0.005 is given.

Also, in the case of the influence of the weight of the second article P, numerical values similar to those given in the case of the above transfer by the transfer device 43 are adopted as-is.

The number of passes is further added to the location coefficient and the weight coefficient to obtain corresponding scores.

The values are given and added up each time a transfer device 43 performs transfer and a lifting platform of a stacker crane passes as described above, and thus corresponding scores are calculated.

As one example, if the summed value (total value) of a score reaches 500 or more, it is determined that the timing for performing misalignment correction has been reached, a misalignment correction instruction is issued in order to execute the misalignment correction operation, and the misalignment correction operation is executed.

When the misalignment correction operation is executed, the score of the first shelf is reset to 0.

Figure 11:
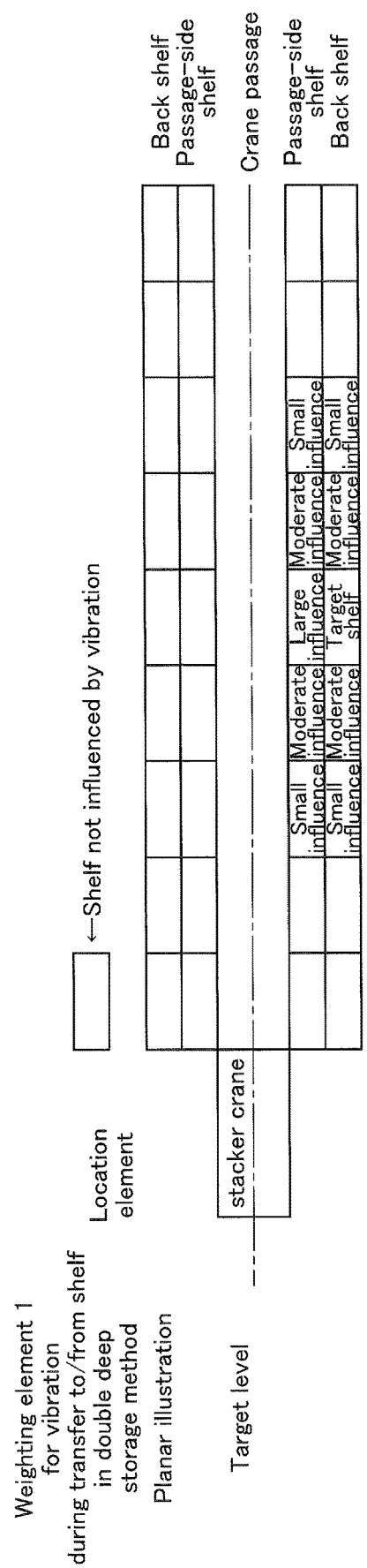
FIG. 11 is a conceptual diagram in which the influence of vibration that accompanies transfer is evaluated for each of various transfer locations when a second article is transferred to the vicinity of a first shelf by a transfer device mounted on a lifting platform of a stacker crane, according to Embodiment IV.

Embodiment IV: Case of Stacker Crane Type of Transport Device and Double Deep Type of Article P Shelf Placement Method FIG. 11 is a conceptual diagram in which the influence of vibration that accompanies transfer is evaluated for each of various transfer locations when a second article P is transferred to the vicinity of a first shelf by a transfer device 43 mounted on a lifting platform of a stacker crane.

In the present embodiment, the shelf 1a of the storage rack 1 is of a double deep type, and the article P shelf placement method is of a double deep type.

If a second article P is transferred to a passage-side shelf at the same level as the first shelf (i.e., a shelf on the side on which stacker crane passes), the influence of the transfer is estimated to be the largest, whereas if a second article P is transferred to a shelf to the left or the right of the first shelf and the passage-side shelf, the influence of transfer is estimated to be moderate.

If a second article P is transferred to a shelf on the left or right side of the left/right adjacent shelf, the influence of transfer is estimated to be the smallest.

If a second article P is transferred to a shelf other than those described above, the influence of the transfer is estimated to be negligible.

FIG. 12 is a conceptual diagram in which the influence of vibration that accompanies transfer and the influence of vibration that accompanies the passage of a lifting platform of a stacker crane are separately evaluated for cases where a second article P is transferred to the vicinity of a first shelf by a transfer device 43 mounted on the lifting platform of the stacker crane, and also shows an example of logic for making a precise determination regarding misalignment of the first article P.

The upper table section shows the influence of vibration that accompanies the transfer of a second article P to the vicinity of the first shelf by the transfer device 43 mounted on the lifting platform, and also shows the influence of the weight of the second article P that is to be transferred.

For example, in the case of the influence of vibration that accompanies the transfer of a second article P to the vicinity of the first shelf by the transfer device 43, as the location element indicating the positional relationship with the first shelf, a location coefficient of 0.2 is given for a location where the influence is determined to be small, a location coefficient of 2 is given for a location where the influence is determined to be moderate, and a location coefficient of 6 is given for a location where the influence is determined to be large.

Also, in the case of the influence of the weight of the second article P, a weight coefficient of 0.5 is given in the case of light weight, a weight coefficient of 1 is given in the case of medium weight, and a weight coefficient of 2 is given in the case of heavy weight.

The number of transfers is further added to the location coefficient and the weight coefficient to obtain corresponding scores.

The lower table section shows the case where the influence of vibration that accompanies the passage of the lifting platform of the stacker crane is taken into consideration.

If the lifting platform passes the same level as the first shelf, a location coefficient of 0.005 is given.

Also, in the case of the influence of the weight of the second article P, numerical values similar to those given in the case of the above transfer by the transfer device 43 are adopted as-is.

The number of passes is further added to the location coefficient and the weight coefficient to obtain corresponding scores.

The values are given and added up each time a transfer device 43 performs transfer and a lifting platform of a stacker crane passes as described above, and thus corresponding scores are calculated.

As one example, if the summed value (total value) of a score reaches 500 or more, it is determined that the timing for performing misalignment correction has been reached, a misalignment correction instruction is issued in order to execute the misalignment correction operation, and the misalignment correction operation is executed.

When the misalignment correction operation is executed, the score of the first shelf is reset to 0.

Other Embodiments

The specific configuration examples in the above-described embodiments are merely representative examples in all respects, and are not intended to limit the present invention such representative examples.

In particular, the location coefficient, the weight coefficient, the threshold value, and the like are merely examples, and embodiments of the present invention are not intended to be limited to such numerical values.

In the above-described embodiment, the location coefficient is set to large influence (6), moderate influence (2), or small influence (0.2) for each transfer location in consideration of the transfer location, for example, but in another embodiment, the location coefficient may be set in a more detailed ranking (e.g., influence 5, 4, 3, 2, 1), and with such a configuration, the influence that vibration caused by transfer of a second article has on a first article can more closely conform to the actual situation.

Also, in the above-described embodiments, in the case of the influence of the weight of the second article P, a weight coefficient of 0.5 is given in the case of light weight, a weight coefficient of 1 is given in the case of medium weight, and a weight coefficient of 2 is given in the case of heavy weight, but in another embodiment, the weight coefficient may be set in more detail.

For example, a value obtained by adding 0.1 to the weight [kg] of the second article P may be adopted as the weight coefficient.

Also, as a change that is within the scope of the present invention and would be easy for a person skilled in the art to implement, the influence of vibration may be sensed by actually using a vibration sensor or the like, and coefficients such as the location coefficient and the weight coefficient may be set so as to converge on more desirable numerical values.

As another change that is within the scope of the present invention and would be easy for a person skilled in the art to implement, the applicable range of locations where the vibration is to be given consideration may be changed.

Overview of Embodiments

The following describes an overview of the automated warehouse system described above.

An automated warehouse system includes:
a storage rack for articles;
a transport device configured to transport an article to the storage rack and transport an article from the storage rack; and
a control unit configured to control an operation of the transport device,
wherein the control unit includes:
a misalignment determination unit configured to determine, after storage of a first article in the storage rack, whether the first article is estimated to have been subjected to vibration exceeding a predetermined threshold value; and
a misalignment correction instruction unit configured to, in response to the misalignment determination unit estimating that the first article has been subjected to vibration exceeding the predetermined threshold value, output a control signal to the transport device to drive the transport device to perform a misalignment correction operation with respect to a placement position of the first article.

According to this automated warehouse system, after storage of an article in the storage rack, if it is estimated that the article has been subjected to vibration exceeding a predetermined threshold value, the transport device can be driven to perform the misalignment correction operation with respect to the placement position of the article, thus making it possible to reliably prevent the case where the placement position of the article becomes misaligned from a predetermined placement position for the article to the extent that the article can no longer be unloaded from the storage rack.

Moreover, it is not necessary to additionally provide the storage rack with a special structure such as in the case of the article storage rack described in Patent Document 1 or Patent Document 2, and misalignment can be addressed with merely a change in software processing performed in the control unit, thus preventing a significant rise in the production cost of the storage rack.

Here, it is preferable that the misalignment determination unit performs the determination by counting the number of times that a second article has been moved to vicinity of the placement position of the first article on a shelf at a level corresponding to the placement position of the article.

According to this automated warehouse system, after the first article is stored in the storage rack, misalignment determination is performed by counting the number of times that a second article is transferred to the vicinity of the placement position of the first article, on a shelf at the same level as the placement position of the first article, which is where the first article is thought to be most influenced by vibration, thus making it possible to efficiently and reliably detect misalignment of the first article from the predetermined placement position.

Also, it is preferable that the misalignment determination unit performs the determination by adding, to the number of transfers, a location coefficient based on a transfer location of the second article on the shelf at the level corresponding to the placement position of the first article.

For each transfer location, in consideration of the transfer location, the location coefficient is set to large influence, moderate influence, or small influence, or set in a more detailed ranking such as influence 5, 4, 3, 2, or 1, and with such a configuration, the influence that vibration caused by transfer of a second article has on the first article can be more finely and accurately reflected in the misalignment determination.

Therefore, according to the above automated warehouse system, the influence that vibration caused by the transfer of a second article has on the first article can be more finely and accurately reflected in the misalignment determination.

Also, it is preferable that the misalignment determination unit performs the determination by not only counting the number of times that a second article has been moved to vicinity of the placement position of the first article on the shelf at the level corresponding to the placement position of the article, but also counting the number of times that another article has been transferred to vicinity of the placement position of the first article on a shelf above or below the shelf on which the first article is placed.

According to this automated warehouse system, the influence that vibration caused by the transfer of a second article has on the first article can be more even more accurately reflected in misalignment determination.

Also, it is preferable that the misalignment determination unit performs the determination by counting the number of times that a travel carrier of the transport device travels on a rail on a shelf at a level corresponding to the placement position of the first article.

According to this automated warehouse system, misalignment determination can be performed with consideration given not only to the influence of vibration caused by the transfer of a second article, but also to the influence of vibration caused by the travel carrier of the transport device traveling on the rail.

Also, it is preferable that the misalignment determination unit performs the determination by not only counting the number of times that the travel carrier of the transport device travels on the rail on the shelf at the level corresponding to the placement position of the first article, but also counting the number of times that the travel carrier of the transport device travels on a rail at a level above or below the shelf on which the first article is placed.

According to this automated warehouse system, the number of times that the travel carrier of the transport device has travelled on the rail above or below the level at which the article is placed is also counted, and thus the influence of vibration caused by the traveling of the travel carrier of the transport device can be more accurately reflected in the misalignment determination.

Also, it is preferable that in a case where the transport device is of a stacker crane type, the misalignment determination unit performs the determination that additionally involves counting the number of times a lifting platform has passed a level corresponding to the placement position of the first article.

According to this automated warehouse system, misalignment determination can be performed with consideration given not only to the influence of vibration caused by the transfer of a second article, but also to the influence of vibration caused by the lifting platform of the stacker crane passing the same level as the placement position of the article.

Also, it is preferable that the misalignment determination unit performs the determination that is additionally based on a weight of the second article transported by the transport device.

Both when a second article is transferred and when the travel carrier of the transport device travels, the amount of vibration that is applied to the first article is greatly influenced by the weight of the second article.

According to the above automated warehouse system, the influence of the weight of the second article is also taken into consideration, thus making it possible for the magnitude of the influence of vibration on the first article to be made closer to the actual situation.

Also, it is preferable that in a case where the storage rack for articles is of a single deep type, the misalignment determination unit, in estimating that the first article has been subjected to vibration exceeding the predetermined threshold value, uses logic optimized for a storage rack of the single deep type by mainly selecting a location coefficient.

According to this automated warehouse system, the system can be easily optimized for a storage rack of a single deep type.

Also, it is preferable that in a case where the storage rack for articles is of a double deep type, the misalignment determination unit, in estimating that the first article has been subjected to vibration exceeding the predetermined threshold value, uses logic optimized for a storage rack of the double deep type by mainly selecting a location coefficient.

According to this automated warehouse system, the system can be easily optimized for a storage rack of a double deep type.

Also, it is preferable that the misalignment correction operation is based on a pseudo transfer operation performed by a transfer device mounted on the transport device.

According to this automated warehouse system, by employing a pseudo transfer operation performed by the transfer device mounted on the transport device, the misalignment correction operation can be completed in a short time.

Also, it is preferable that in a case where the transfer device mounted on the transport device is of a single deep type, the pseudo transfer operation performed by the transfer device is optimized for a transfer device of the single deep type.

According to this automated warehouse system, the pseudo transfer operation performed by the transfer device is optimized for a transfer device of a single deep type, thus making it possible for the pseudo transfer operation to be completed in a shorter time in the system.

Also, it is preferable that in a case where the transfer device mounted on the transport device is of a double deep type, the pseudo transfer operation performed by the transfer device is optimized for a transfer device of the double deep type.

According to this automated warehouse system, the pseudo transfer operation performed by the transfer device is optimized for a transfer device of a double deep type, thus making it possible to realize a system in which the pseudo transfer operation can be completed in a shorter time even if the transfer device is of a double deep type.

Also, it is preferable that the misalignment correction operation is based on a pseudo unloading and loading operation performed by the transport device.

According to this automated warehouse system, the misalignment correction operation can be reliably realized by a pseudo loading/unloading operation performed by the transport device.

What is claimed is:

1. An automated warehouse system comprising:
   a storage rack for articles;
   a transport device configured to transport an article to the storage rack and transport an article from the storage rack; and
   a control unit configured to control an operation of the transport device,
   wherein the control unit comprises:
   a misalignment determination unit configured to determine, after storage of a first article in the storage rack, whether the first article is estimated to have been subjected to vibration exceeding a predetermined threshold value; and
   a misalignment correction instruction unit configured to, in response to the misalignment determination unit estimating that the first article has been subjected to vibration exceeding the predetermined threshold value, output a control signal to the transport device to drive the transport device to perform a misalignment correction operation with respect to a placement position of the first article.

2. The automated warehouse system according to claim 1, wherein, in a case where the transport device is of a stacker crane type, the misalignment determination unit performs the determination that additionally involves counting the number of times a lifting platform has passed a level corresponding to the placement position of the first article.

3. The automated warehouse system according to claim 1, wherein the misalignment determination unit performs the determination that is additionally based on a weight of the second article transported by the transport device.

4. The automated warehouse system according to claim 1, wherein, in a case where the storage rack for articles is of a single deep type, the misalignment determination unit, in estimating that the first article has been subjected to vibration exceeding the predetermined threshold value, uses logic optimized for a storage rack of the single deep type by mainly selecting a location coefficient.

5. The automated warehouse system according to claim 1, wherein, in a case where the storage rack for articles is of a double deep type, the misalignment determination unit, in estimating that the first article has been subjected to vibration exceeding the predetermined threshold value, uses logic optimized for a storage rack of the double deep type by mainly selecting a location coefficient.

6. The automated warehouse system according to claim 1, wherein the misalignment correction operation is based on a pseudo unloading and loading operation performed by the transport device.

7. The automated warehouse system according to claim 1, wherein the misalignment determination unit performs the determination by counting the number of times that a travel carrier of the transport device travels on a rail on a shelf at a level corresponding to the placement position of the first article.

8. The automated warehouse system according to claim 7, wherein the misalignment determination unit performs the determination by counting the number of times that the travel carrier of the transport device travels on the rail on the shelf at the level corresponding to the placement position of the first article, and also counting the number of times that the travel carrier of the transport device travels on a rail at a level above or below the shelf on which the first article is placed.

9. The automated warehouse system according to claim 1, wherein the misalignment determination unit performs the determination by counting the number of times that a second article has been moved to vicinity of the placement position of the first article on a shelf at a level corresponding to the placement position of the article.

10. The automated warehouse system according to claim 9, wherein the misalignment determination unit performs the determination by adding, to the number of transfers, a location coefficient based on a transfer location of the second article on the shelf at the level corresponding to the placement position of the first article.

11. The automated warehouse system according to claim 9, wherein the misalignment determination unit performs the determination by counting the number of times that a second article has been moved to vicinity of the placement position of the first article on the shelf at the level corresponding to the placement position of the article, and also counting the number of times that another article has been transferred to vicinity of the placement position of the first article on a shelf above or below the shelf on which the first article is placed.

12. The automated warehouse system according to claim 1, wherein the misalignment correction operation is based on a pseudo transfer operation performed by a transfer device mounted on the transport device.

13. The automated warehouse system according to claim 12, wherein in a case where the transfer device mounted on the transport device is of a single deep type, the pseudo transfer operation performed by the transfer device is optimized for a transfer device of the single deep type.

14. The automated warehouse system according to claim 12, wherein in a case where the transfer device mounted on the transport device is of a double deep type, the pseudo transfer operation performed by the transfer device is optimized for a transfer device of the double deep type.

15. A method for correcting misalignment of a placement position of an article in an automated warehouse system, the automated warehouse system comprising:
   a storage rack for articles;
   a transport device configured to transport an article to the storage rack and transport an article from the storage rack; and
   a control unit configured to control an operation of the transport device,
   the method comprising:
   causing the control unit to:
   determine, after storage of a first article in the storage rack, whether the first article is estimated to have been subjected to vibration exceeding a predetermined threshold value; and in response to estimation during the determining that the first article has been subjected to vibration exceeding the predetermined threshold value, output a control signal to the transport device to drive the transport device to perform a misalignment correction operation with respect to a placement position of the first article.

16. A computer program product comprising at least one non-transitory computer-readable storage medium including instructions for executing misalignment correction with respect to a placement position of an article in an automated warehouse system, the instructions, when executed by a computer comprising at least one processor, cause the computer to:

determine, after storage of a first article in the storage rack, whether the first article is estimated to have been subjected to vibration exceeding a predetermined threshold value; and in response to estimation during the determining that the first article has been subjected to vibration exceeding the predetermined threshold value, output a control signal to a transport device for transporting an article to drive the transport device to perform a misalignment correction operation with respect to a placement position of the first article.

17. A non-transitory computer-readable recording medium comprising instructions for executing misalignment correction with respect to a placement position of an article in an automated warehouse system, the instructions, when executed by a computer comprising at least one processor, cause the computer to:

determine, after storage of a first article in the storage rack, whether the first article is estimated to have been subjected to vibration exceeding a predetermined threshold value; and in response to estimation during the determining that the first article has been subjected to vibration exceeding the predetermined threshold value, output a control signal to a transport device for transporting an article to drive the transport device to perform a misalignment correction operation with respect to a placement position of the first article.

* * * * *